United States Patent
Wu et al.

(10) Patent No.: US 12,381,909 B2
(45) Date of Patent: Aug. 5, 2025

(54) METHOD FOR DETECTING SLOW HTTP DOS IN BACKBONE NETWORK

(71) Applicant: SOUTHEAST UNIVERSITY, Nanjing (CN)

(72) Inventors: Hua Wu, Nanjing (CN); Jinfeng Chen, Nanjing (CN); Guang Cheng, Nanjing (CN); Xiaoyan Hu, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 18/548,937

(22) PCT Filed: Jun. 26, 2023

(86) PCT No.: PCT/CN2023/102350
§ 371 (c)(1),
(2) Date: Sep. 5, 2023

(87) PCT Pub. No.: WO2024/174432
PCT Pub. Date: Aug. 29, 2024

(65) Prior Publication Data
US 2025/0023910 A1    Jan. 16, 2025

(30) Foreign Application Priority Data
Feb. 20, 2023   (CN) .......................... 202310137086.1

(51) Int. Cl.
*H04L 9/40*        (2022.01)
(52) U.S. Cl.
CPC ............................... *H04L 63/1458* (2013.01)
(58) Field of Classification Search
CPC .................................................. H04L 63/1458
See application file for complete search history.

(56) References Cited

U.S. PATENT DOCUMENTS 12,218,968 B1 *   2/2025  Harb ..................... H04L 63/145
12,289,343 B2 *   4/2025  Djukic ............... H04L 63/1416
(Continued)

FOREIGN PATENT DOCUMENTS

| CN | 113206859 A | 8/2021 |
| CN | 114172697 A | 3/2022 |
| KR | 20200009366 A | 1/2020 |

OTHER PUBLICATIONS

Youqiong Zhuang, et al., HDS: A Hierarchical Scheme for Accurate and Efficient DDoS Flooding Attack Detection, IEICE—The 23rd Asia-Pacific Network Operations and Management Symposium (APNOMS), 2022.

*Primary Examiner* — Stephen T Gundry
(74) *Attorney, Agent, or Firm* — Bayramoglu Law Offices LLC (57) ABSTRACT

A method for detecting slow HTTP DoS (SHD) attacks in a backbone network can detect three different types of SHID attacks. The method is divided into an off-line training phase and an on-line detection phase. In the off-line training phase, several types of representative unidirectional traffic features are extracted according to attack characteristics of different SHD types and corresponding feature groups are built, where these features can effectively deal with a large amount of unidirectional traffic in backbone networks; a public backbone network dataset is systematically sampled and data are stored in combination with Count-min Sketch, which greatly minimizes storage and computational overhead required in the backbone networks; and a specific machine learning algorithm is used for training to obtain attack detection models. The method can be used for detecting and warning SHD attacks in mass traffic scenarios such as backbone networks to provide a basis for maintaining network security.

8 Claims, 4 Drawing Sheets

(56) References Cited

U.S. PATENT DOCUMENTS

| | | | |
|---|---|---|---|
| 2022/0224706 A1* | 7/2022 | Peng | G06N 3/047 |
| 2022/0330027 A1* | 10/2022 | Djukic | H04L 47/2475 |
| 2022/0368703 A1* | 11/2022 | Jiang | H04L 63/1416 |
| 2023/0024018 A1* | 1/2023 | Vega | G06N 3/09 |
| 2023/0025946 A1* | 1/2023 | Li | H04L 41/145 |
| 2023/0088676 A1* | 3/2023 | She | G06N 3/088 |
| | | | 706/25 |
| 2023/0125310 A1* | 4/2023 | Zhang | G06N 20/00 |
| | | | 726/22 |
| 2023/0171276 A1* | 6/2023 | Bisht | H04L 63/1441 |
| | | | 726/23 |
| 2023/0179618 A1* | 6/2023 | Achleitner | H04L 63/1416 |
| | | | 726/23 |
| 2023/0188552 A1* | 6/2023 | Sern | H04L 41/12 |
| 2023/0216746 A1* | 7/2023 | Ucci | G06N 7/01 |
| | | | 709/224 |
| 2023/0231860 A1* | 7/2023 | Tian | G06N 5/022 |
| | | | 726/1 |
| 2023/0328528 A1* | 10/2023 | Monshizadeh | H04W 12/122 |
| | | | 726/23 |
| 2023/0412618 A1* | 12/2023 | Leslie | H04L 63/1416 |
| 2023/0412623 A1* | 12/2023 | Leslie | H04L 63/1458 |
| 2024/0037231 A1* | 2/2024 | Jia | G06F 21/566 |
| 2024/0064107 A1* | 2/2024 | Qiu | H04L 63/1416 |
| 2024/0187430 A1* | 6/2024 | Holbrook | G06N 5/01 |
| 2024/0244070 A1* | 7/2024 | Mohapatra | H04L 63/1425 |
| 2024/0396908 A1* | 11/2024 | Neupane | G06N 3/045 |

* cited by examiner

METHOD FOR DETECTING SLOW HTTP DOS IN BACKBONE NETWORK

CROSS REFERENCE TO THE RELATED APPLICATIONS

This application is the national phase entry of International Application No. PCT/CN2023/102350, filed on Jun. 26, 2023, which is based upon and claims priority to Chinese Patent Application No. 202310137086.1, filed on Feb. 20, 2023, the entire contents of which are incorporated herein by reference.

TECHNICAL FIELD

The present invention relates to a method for detecting slow HTTP DoS in a backbone network, belonging to the field of cyberspace security technology.

BACKGROUND

Nowadays, distributed denial of service (DDoS) has become one of the attacks with most direct harm and most wide influence on the Internet. Conventional DDoS such as SYN Flood often generates a large amount of traffic during attacks. Nowadays, detection technologies for high-traffic DDoS have been increasingly mature. Therefore, attackers have designed many novel DDoS attacks, which are more advanced and beneficial to attackers compared with conventional attacks. SHD is a low-speed and low-traffic stealthy attack in the application layer. A goal of SHD may often be located at a key node in a backbone network, and huge traffic passes through the key node in the backbone network, so that SHD traffic occupies a smaller proportion. Detecting the SHD traffic in the backbone network is challenging, but can strengthen a security line of the backbone network and avoid significant losses caused by attacks. Therefore, it is of great significance to efficiently detect slow HTTP DoS in the backbone network.

In recent years, some scholars have proposed several detection methods for SHD. Most existing methods observe detailed bidirectional flow data such as quantities of uplink and downlink packets, uplink and downlink time to live (TTL), and intervals between uplink and downlink packets, and select some features from them to fully depict a corresponding state of each flow as much as possible. These methods can achieve ideal effects in small-scale networks with low traffic, but nowadays, backbone networks are very fast, and the data volume of important network nodes per second can usually reach Gbps or even higher. The following several types of existing SHD attack detection methods have some limitations in high-traffic backbone networks.

(1) A Detection Method Based on a Potential Traffic Pattern.

This method requires careful observation on an attack behavior and traffic pattern of SHD, and infers potential laws in the SHD traffic pattern through rigorous mathematical methods, such as periodicity of SHD traffic, length relationship between packets, and time interval relationship between packets. This method can achieve ideal effects in non-sampled environments, but in environments such as backbone networks that require large-scale sampling, the sampled traffic pattern may change. The lower sampling rate indicates a larger change in the traffic pattern and makes the traffic pattern unstable. Therefore, the detection rate of this method decreases sharply. This method is difficult to apply to the detection of SHD attacks in backbone networks.

(2) A Detection Method Based on Artificial Intelligence.

This method classifies traffic by means of artificial intelligence. Scholars often manually or automatically find out some features of SHD traffic. This method can achieve good effects in detection accuracy by means of the powerful learning ability of artificial intelligence and the superior performance of specific algorithms in classification problems. However, existing methods using artificial intelligence are difficult to apply to backbone networks. On the one hand, existing detection methods using deep learning hardly detect mass data in the backbone network in real time due to the complexity of algorithms. On the other hand, existing detection methods using machine learning almost select a large number of parameters as features, which further increases the computational amount and makes them difficult to apply to the backbone networks. Excessive features also mean that they are less representative and unfavorable for analysis on traffic in subsequent defense phases. In addition, these methods are all based on bidirectional traffic and do not consider the situation where only unidirectional traffic can be captured, namely, asymmetric routing occurs. However, the asymmetric routing is relatively common in the backbone networks. Therefore, the existing methods based on artificial intelligence are difficult to apply to the detection of SHD attacks in the backbone network.

The detection on SHD attacks in the backbone network requires high standards for accuracy of a method, adaptability to a network environment, and computational efficiency. Present difficulties may be summarized as follows: (1) the backbone network environment further reduces the proportion of SHD traffic, and makes the SHD traffic stealthier; (2) the existing methods are only applicable to small networks that use full traffic, the use of full traffic in the backbone network consumes a lot of resources and makes it difficult to achieve real-time detection, and the accuracy of the existing methods cannot meet detection requirements in cases of low sampling rates; and (3) most of the existing methods are based on bidirectional flow data, and do not consider that the traffic passing through key nodes in the backbone network is often unidirectional, i.e., do not consider asymmetry of routing. If the methods cannot solve any of the three difficulties, attack traffic may not be detected accurately or in time, leading to node downtime and abnormal communication between networks.

The method for detecting SHD attacks, provided by the present invention, can solve the problem in the current field of cybersecurity that the SHD traffic in the backbone network is difficult to discover effectively.

SUMMARY

To solve the above problems, the present invention discloses a method for detecting slow HTTP DoS (SHD) in a backbone network. According to different utilization of protocols, common SHD attacks may be divided into three types: Slow Header (Slowloris), Slow Message Body (RUDY), and SlowREAD. The three types of different attacks may be detected by the method proposed in the present invention, respectively. The detecting method in the present invention is divided into an off-line training phase and an on-line detection phase. In the off-line training phase, several types of representative unidirectional traffic features are extracted according to attack characteristics of different SHD types and corresponding feature groups are built, where these features can effectively deal with a large amount of unidirectional traffic in backbone networks; a public backbone network dataset is systematically sampled and data are stored in combination with Count-min Sketch, which greatly minimizes storage and computational overhead required in the backbone networks; and finally, a specific machine learning algorithm is used for training to obtain attack detection models. In the on-line detection phase, similar data preprocessing is performed on the traffic captured by the actual backbone network nodes to obtain traffic feature vectors, which are input into the attack detection models to detect the presence of attack in the current traffic. The present invention can be used for detecting and warning SHD attacks in mass traffic scenarios such as backbone networks to provide a basis for maintaining network security.

In order to achieve the purpose of the present invention, the specific technical steps of this solution are as follows: A method for detecting slow HTTP DoS in a backbone network, wherein the method comprises the following steps:

step (1) obtaining a public backbone network dataset and attack dataset, and extracting traffic therefrom; systematically sampling traffic according to specific scenario requirements and a rate of 1/n to obtain sampled traffic; The sampling can reduce mass computation caused by the traffic of a backbone network and also reduce required storage space.

step (2) a principle of the SHD attacks is analyzed, several unidirectional traffic features that can reflect overall characteristics of the attacks, such as a quantity of TCP packets without payload, a quantity of TCP packets with payload, and distribution of traffic <IP, port>, are extracted, and specific unidirectional traffic features are extended from original features according to differences in different types of SHD attacks, so as to build a feature group for each type of SHD attack.

step (3) extracting and storing the features described in step (2) on the basis of the sampled traffic according to different attack types by using a FarmHash function, Bitmaps, and a custom Count-min Sketch data structure, wherein the custom Sketch structure can reduce storage overhead;

step (4) labeling the features according to an actual type of traffic to form a labeled feature vector, the label comprising three types of attack traffic and normal traffic;

step (5) selecting a machine learning algorithm with lower complexity in order to further improve a processing speed, and inputting the feature vector obtained in step (4) into the machine learning algorithm for training to obtain traffic models for the three types of SHD attacks;

step (6) capturing real-time traffic from real backbone network nodes, and performing traffic sampling and features obtaining operations separately according to the processes in steps (1) and (3), wherein the features here can still be obtained from unidirectional traffic; and step (7) inputting unlabeled feature vectors generated in real time into the three attack traffic models obtained in step (5), correspondingly labeling the feature vectors according to output of the models to identify corresponding traffic types, and carrying out subsequent defense work according to the generated results.

Furthermore, step (1) specifically comprises the following sub steps:

(1.1) obtaining the authoritative backbone network dataset as background traffic, wherein data in a unified format for subsequent processing are required to be selected or organized according to actual needs from backbone network datasets published on the Internet at present in incompletely identical forms;

(1.2) building a distributed attack environment to simulate real-time attacks, implementing three types of SHD attacks by using an authoritative SHD tool to obtain attack traffic, and unifying the attack traffic in the format of the background traffic in (1.1); and (1.3) merging the background traffic and the attack traffic to obtain mixed traffic, and systematically sampling the mixed traffic according to the specific scenario requirements and the rate of 1/n to obtain the sampled traffic.

Furthermore, step (2) specifically comprises the following sub steps:

(2.1) analyzing an overall principle of the SHD attacks, observing similar behaviors of different attack traffic, and extracting several unidirectional traffic features that can reflect common characteristics, wherein these features do not involve specific content of an application layer, such as a quantity of TCP packets without payload, a quantity of TCP packets with payload, and distribution of <IP, port> pairs;

(2.2) further refining specific unidirectional traffic features for each attack based on the differences of different types of SHD attacks in traffic, such as a packet sending rate, a quantity of packets with an RWND value of 0; and (2.3) combining the common characteristics of SHD with corresponding specific features according to the attack types to build a specific feature group for each attack.

Furthermore, step (3) specifically comprises the following sub steps:

(3.1) updating the Sketch data structure once every time a packet is obtained, wherein the custom Count-min Sketch structure has a plurality of storage units, and each of the storage units comprises several Bitmaps and counters to store various types of features;

(3.2) hashing the <IP, port> for a situation that the distribution of traffic in step (2.1) cannot be directly obtained, wherein a FarmHash function is used here in order to improve processing speed and reduce memory consumption; then mapping hash values to a Bitmap of the Sketch according to specific processing rules, and finally representing the distribution of traffic by a quantity of 1 in the Bitmap;

(3.3) directly obtaining other features in step (2) through specific formulas or storing other features by using the counters within the custom Sketch; and (3.4) extracting data once after the units corresponding to each key are updated k times as required in the Count-min Sketch structure, and therefore, obtaining a feature vector after the units corresponding to the same <protocol, IP> are updated k times.

Furthermore, in step (4), the features are extracted based on <protocol, IP> of packets, each type of attack traffic is generated by a specific IP during simulation of attacks, and therefore, the features are labeled with attack types based on <protocol, IP>; and if the IP of the feature does not belong to the specific attack IP, the traffic is background traffic and marked as normal traffic.

Furthermore, in step (5), the features are trained by using the machine learning algorithm, wherein the selection of the algorithm needs to consider the characteristics of processing speed, good classification performance, and over-fitting prevention, and a random forest algorithm is selected in this step to train the models for the three types of SHD attacks by the features in step (4).

Furthermore, in step (6), the presence of SHD attack traffic in the backbone network is detected by deploying relevant software and hardware at some important nodes of the backbone network to capture real-time traffic, such as a core router, a firewall, and a large web server of the backbone network; the traffic can be unidirectional, and are in the same format as that in step (1.1); and systematic sampling is performed at a rate of 1/n, and features of the sampled traffic are extracted and stored according to step (3).

Furthermore, step (7) specifically comprises the following sub steps:
(7.1) inputting the features generated in real time into the traffic models for the three types of SHD attacks obtained in the training phase for prediction, integrating prediction results of all the models, and labeling the current features to complete the detection of SHD traffic; and
(7.2) executing corresponding strategies according to the actual prediction results: releasing the normal traffic, and alarming the attack traffic to notify a network administrator; and determining whether to output the corresponding attack IP according to actual needs in the case that the features are extracted based on <protocol, IP>, so as to provide a basis for further defense operations.

Compared with the Prior Art, the Technical Solution of the Present Invention has the Following Beneficial Technical Effects.
(1) The present invention proposes a method for quickly and accurately detecting slow HTTTP DoS in scenarios with mass traffic such as a backbone network. The method can analyze statistical characteristics of current traffic on the backbone network and efficiently detect SHD traffic based on these features to provide a data basis for network security personnel.
(2) The present invention extracts a few highly representative features through in-depth observation and analysis on the characteristics of SHD traffic, and combines sampling technology to effectively deal with the problem of high computational complexity caused by mass traffic in the backbone network. Even at low sampling rates, these features can still maintain good robustness and effectively detect SHD traffic. In addition, the present invention uses the custom Count-min Sketch structure to record traffic information, thereby greatly reducing storage overhead.
(3) All the features extracted in the present invention can be obtained from unidirectional traffic, which means that the method of the present invention is still effective even if there are a large number of asymmetric routings in the backbone network and the key nodes in the backbone network can capture only unidirectional flow data. Most of the existing studies are based on bidirectional traffic, and do not consider unidirectional traffic which is quite common in practice. Moreover, as only unidirectional traffic is required, the present invention does not require combining traffic into flows, which can further accelerate detection and enable network security personnel to take defense measures in a timely manner. This is highly consistent with the requirements of the backbone network.
(4) The method in the present invention can extract required features without reading specific plain text at an application level. The SHD attacks are located on the application layer, data therein may be encrypted, and existing methods that use plain text for discrimination cannot effectively deal with encrypted cases. The method of the present invention avoids the use of plain text on the application layer, so even if the data are encrypted, the method can still stably detect attack traffic, which adapts to the current trend of increasing encrypted traffic in the backbone network.

DETAILED DESCRIPTION OF THE EMBODIMENTS

The technical solution provided by the present invention will be described in detail below in conjunction with specific embodiments. It should be understood that the following specific implementations are only used for describing the present invention, rather than limiting the scope of the present invention.

Figure 1:
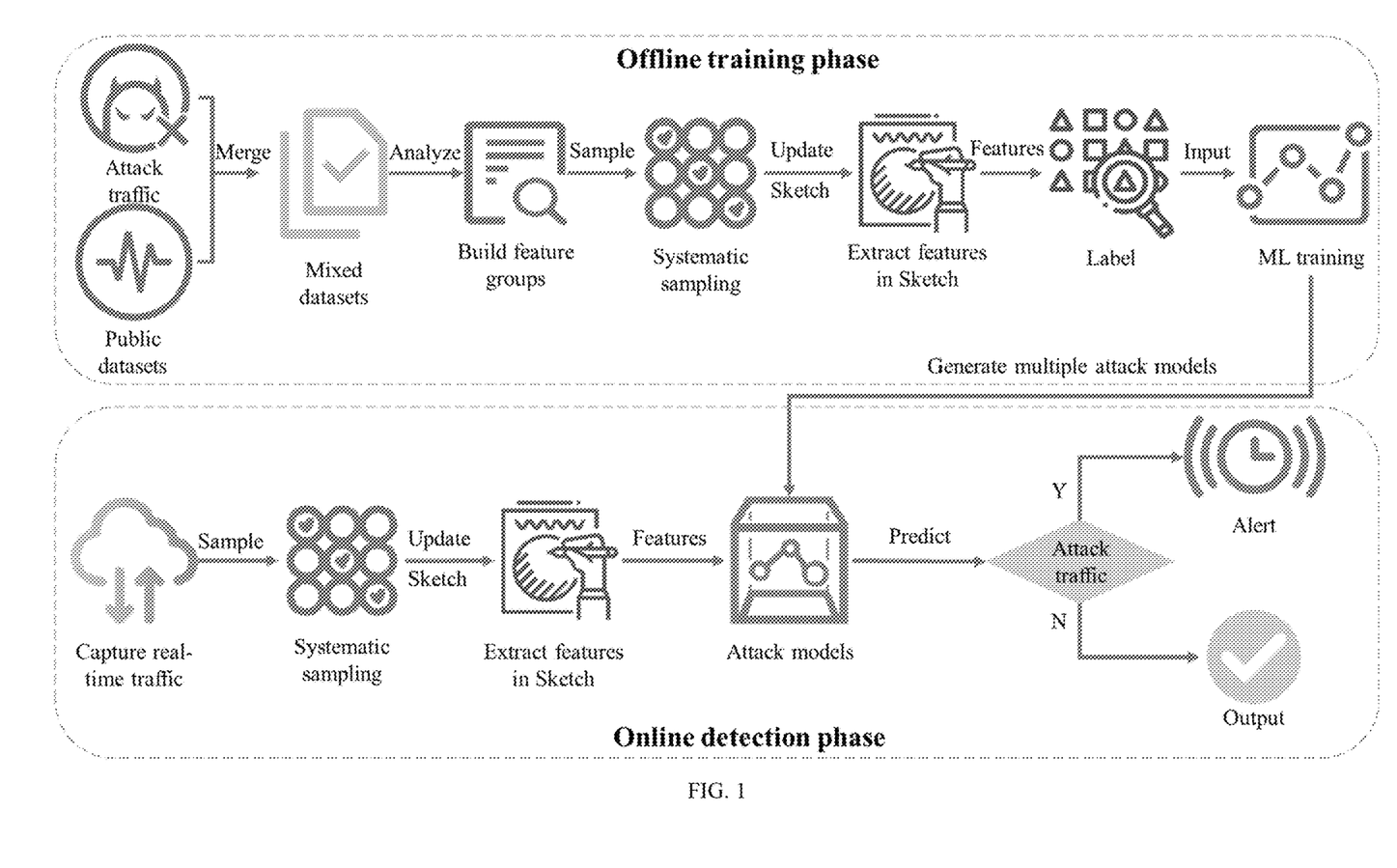
FIG. 1 is a system framework diagram of a method for detecting slow HTTP DoS in a backbone network.

Embodiment: The present invention provides a method for detecting slow HTTP DoS in a backbone network. An overall system framework is shown in FIG. 1, and the method includes the following steps:

Step (1) A public backbone network dataset and attack dataset are obtained, and traffic information is extracted therefrom. Traffic is systematically sampled according to specific scenario requirements and a rate of 1/n to obtain sampled traffic. The sampling can reduce mass computation caused by the traffic of a backbone network and also reduce the required storage space.

In one embodiment of the present invention, the traffic for training is obtained as follows:
(1.1) The authoritative backbone network dataset is obtained as background traffic, where data in a unified format for subsequent processing are required to be selected or organized according to actual needs from backbone network datasets published on the Internet at present in incompletely identical forms. The MAWI dataset is selected here.
(1.2) A distributed attack environment is built to simulate real-time attacks, three types of SHD attacks are implemented by using an authoritative SHD tool to obtain attack traffic, and the attack traffic is unified in the format of the background traffic in (1.1), where the slowhttptest tool is selected here. In this example, a Slowloris attack is implemented on a host whose IP belongs to 192.168.137.0/24, an RUDY attack is implemented on a host whose IP belongs to 192.168.138.0/24, a SlowREAD attack is implemented on a host whose IP belongs to 192.168.139.0/24, and IP 192.168.102.1 is attacked.
(1.3) The background traffic and the attack traffic are merged to obtain mixed traffic. Some parameters of mixed traffic are shown in Table 1. According to specific scenario requirements, n is 64, and the mixed traffic is systematically sampled according to a rate of 1/64 to obtain the sampled traffic.

TABLE 1

| | Some parameters of mixed traffic | | | | |
|---|---|---|---|---|---|
| Attack type | Quantity of unidirectional flows in public dataset | Quantity of bidirectional flows in public dataset | Attack flows | Total number of flows | Percentage of unidirectional flow |
| Slowloris | 2228200 | 419977 | 2127 | 2650304 | 84.073% |
| RUDY | 2228200 | 419977 | 12916 | 2661093 | 83.733% |
| SlowREAD | 2228200 | 419977 | 28256 | 2676433 | 83.253% |

Step (2) A principle of the SHD attacks is analyzed, several unidirectional traffic features that can reflect overall characteristics of the attacks, such as a quantity of TCP packets without payload, a quantity of TCP packets with payload, and distribution of traffic <IP, port>, are extracted, and specific unidirectional traffic features are extended from original features according to differences in different types of SHD attacks, so as to build a feature group for each type of SHD attack.

In one embodiment of the present invention, a corresponding feature group is built according to an attack type as follows:

(2.1) An overall principle of the SHD attacks is analyzed, similar behaviors of different attack traffic are observed, several unidirectional traffic features that can reflect common characteristics are extracted, and these features do not involve specific content of an application layer, such as the quantity of TCP packets without payload, the quantity of TCP packets with payload, and the distribution of <IP, port>.

(2.2) As the characteristics of different types of SHD attacks are not exactly the same, specific unidirectional traffic features, such as a packet sending rate, a quantity of packets with an RWND value of 0, are required to be further refined based on the differences in traffic for each attack.

(2.3) The common characteristics of SHD are combined with corresponding specific features according to the attack types to build a specific feature group for each attack. Table 2 lists some feature names and their meanings.

TABLE 2

| Some feature names and their meanings | |
|---|---|
| Feature name | Meaning |
| Pck 0 | Quantity of TCP packets sent without payload |
| Pck 1 | Quantity of TCP packets sent with payload |
| Pck SYN | Quantity of TCP packets with SYN of 1 |
| RWND 0 | Quantity of TCP packets with RWND of 0 |
| S Disp | Dispersion of source IPs and ports |
| D Disp | Dispersion of destination IPs and ports |
| Pck spd | Sending rate of TCP packets |
| Len std | Standard deviation of TCP packet length |

Step (3) The features described in step (2) are extracted and stored on the basis of the sampled traffic according to different attack types by using a FarmHash function, Bitmaps, and a custom Count-min Sketch data structure. The custom Sketch structure can reduce storage overhead.

Figure 2:
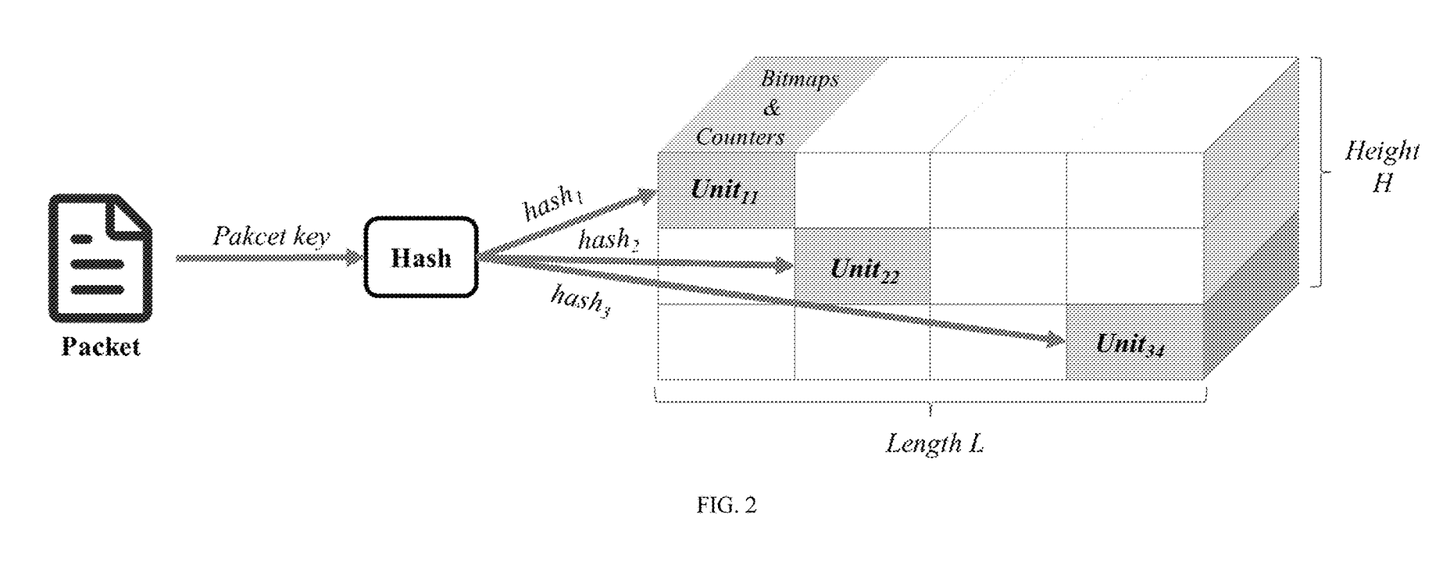
FIG. 2 is a structural diagram of a custom Count-min Sketch.

In one embodiment of the present invention, data features are extracted and stored as follows:

(3.1) The custom Count-min Sketch structure has a plurality of storage units, and each of the storage units includes several Bitmaps and counters to store various types of features; and every time a packet arrives, the Count-min Sketch structure is updated once. FIG. 2 shows the custom Count-min Sketch structure and update process.

Figure 3:
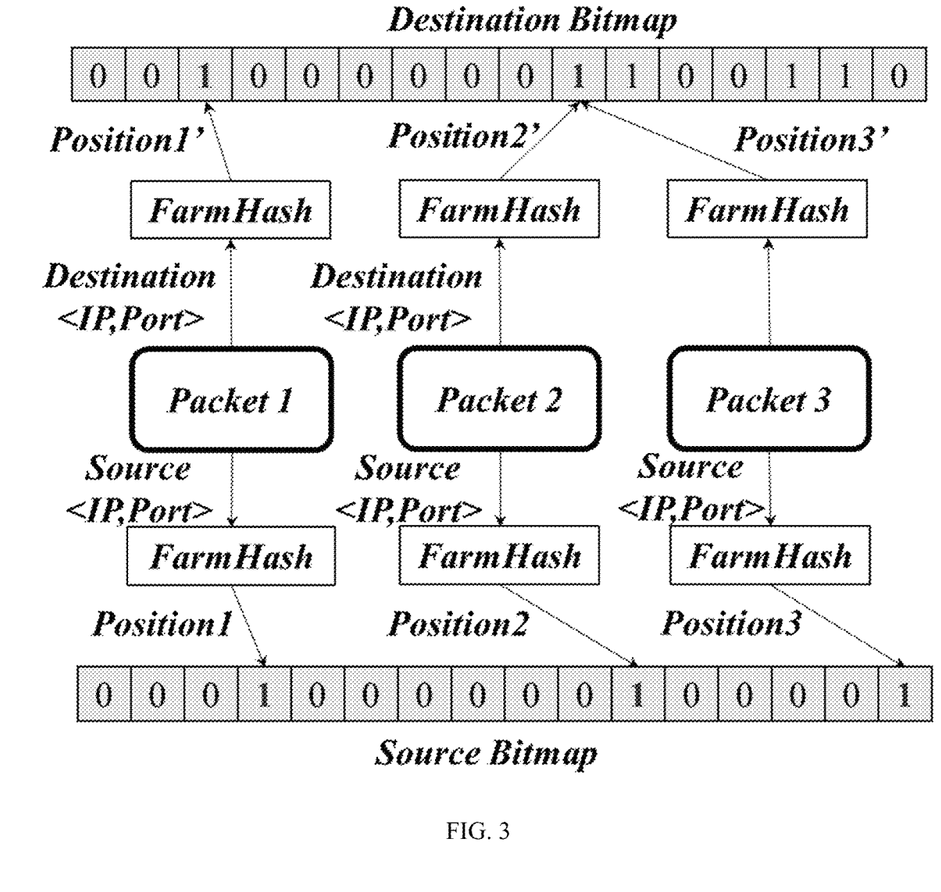
FIG. 3 is a Bitmap update process diagram.

(3.2) The distribution of traffic in step (2.1) cannot be directly obtained, the <IP, port> is required to be hashed, a 32-bit FarmHash function is used here in order to improve processing speed and reduce memory consumption, then hash values are mapped to a Bitmap of the custom Sketch according to specific processing rules, and finally the dispersion of traffic is represented by a quantity of 1 in the Bitmap. FIG. 3 shows a structure and update process of the Bitmap.

(3.3) Other features in step (2) may be directly obtained through specific formulas or stored using counters within the custom Sketch. Table 3 shows meanings, types, and spaces occupied by content in the custom Sketch.

TABLE 3

| Custom Count-min Sketch content | | | |
|---|---|---|---|
| Content | Meaning | Type | Occupied space |
| Np | Quantity of sent TCP packets | Counter | 1 byte |
| Pck_0 | Quantity of TCP packets sent without payload | Counter | 1 byte |
| Pck_1 | Quantity of TCP packets sent with payload | Counter | 1 byte |
| Pck SYN | Quantity of TCP packets with SYN of 1 | Counter | 1 byte |
| RWND_0 | Quantity of TCP packets with RWND of 0 | Counter | 1 byte |
| SourceBitmap | Bitmap recording the distribution of source <IP, port> | Bitmap | 2 bytes |
| SourceBitmap | Bitmap recording the distribution of destination <IP, port> | Bitmap | 2 bytes |

(3.4) Data are extracted once after the units corresponding to each key are updated k times as required in the Count-min Sketch structure, and therefore, a feature vector is obtained after the units corresponding to the same <protocol, IP> are updated k times, where k is 100.

Step (4) The features are labeled according to an actual type of traffic to form a labeled feature vector, the label including three types of attack traffic and normal traffic.

In one embodiment of the present invention, the features are extracted based on <protocol, IP> of packets, and during the simulation of attacks, each type of attack traffic is generated by the hosts in the three network segments 192.168.137.0/24, 192.168.138.0/24, and 192.168.139.0/24. Therefore, the features may be labeled with attack types based on <protocol, IP>. If the IP of the feature does not belong to the three network segments or 192.168.102.1, the traffic is background traffic and marked as normal traffic.

Step (5) A machine learning algorithm with lower complexity is selected in the present invention in order to further improve the processing speed, and the feature vector obtained in step (4) is input into the machine learning algorithm for training to obtain traffic models for the three types of SHD attacks.

In one embodiment of the present invention, the features are trained by using the machine learning algorithm, where the selection of the algorithm needs to consider the characteristics of processing speed, good classification performance, and over-fitting prevention, and a random forest algorithm is selected in this step to train the sample features in step (4) to obtain the traffic models for the three types of SHD attacks.

Step (6) Real-time traffic is captured from real backbone network nodes, and traffic sampling and features obtaining operations are performed separately according to the processes in steps (1) and (3), where the features here can still be obtained from unidirectional traffic.

In one embodiment of the present invention, the presence of SHD attack traffic in the backbone network is detected by deploying relevant software and hardware at several important nodes of the backbone network, such as a core router, a firewall, and a large web server of the backbone network; the traffic can be unidirectional, and are in the same format as that in step (1.1); and systematic sampling is performed at a rate of 1/64, and features of the sampled traffic are extracted and stored according to step (3). An attack relationship diagram of the backbone network may be simplified to a network topology shown in FIG. 4. A total of 50 hosts accessing another node on the backbone network are captured through the key nodes of the backbone network, where hosts 1 to 25 are normal users, and hosts 26 to 50 are attackers.

Step (7) Unlabeled feature vectors generated in real time are input into the three attack traffic models obtained in step (5), the feature vectors are correspondingly labeled according to output of the models to identify traffic types, and subsequent defense work is carried out according to the generated results.

In one embodiment of the present invention, the current traffic is predicted and corresponding measures are taken as follows:

(7.1) The traffic models for the three types of SHD attacks are obtained in the training phase, the features generated in real time are input into the three attack traffic models for prediction, prediction results of all the models are integrated, and the current features are labeled to complete the detection of SHD traffic.

Figure 4:
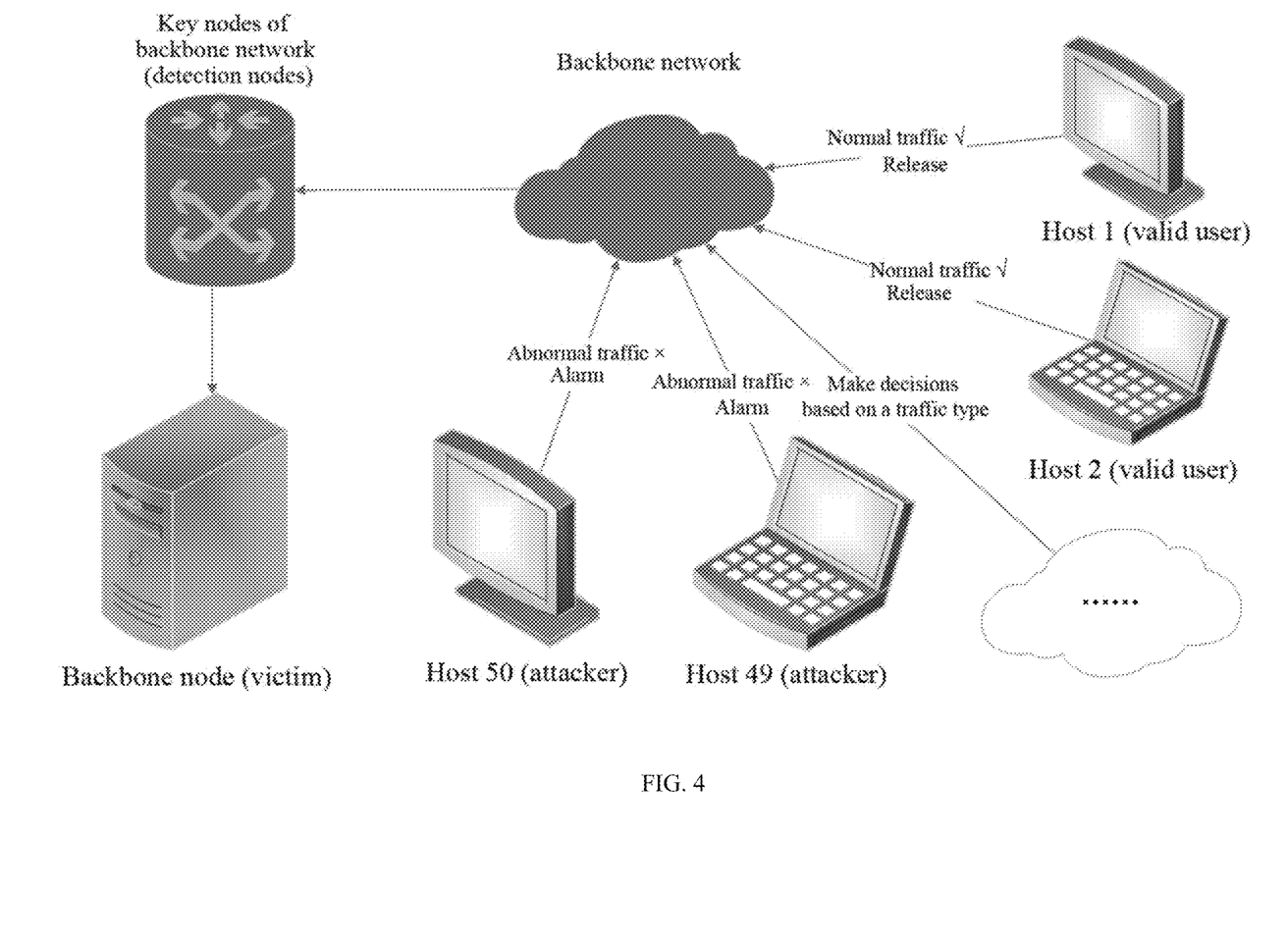
FIG. 4 is a topological diagram of an attack environment.

(7.2) Corresponding strategies are executed according to the actual prediction results, where hosts 1 to 25 generate valid traffic and are released normally, while hosts 26 to 50 generate attack traffic, and the current key nodes will alarm to notify a network administrator. In addition, because the features are extracted based on <protocol, IP>, whether to output IPs of hosts 26 to 50 may be determined according to actual needs to provide a basis for further defense operations, such as adding the IP addresses to a blacklist.

The technical means disclosed in the solution of the present invention are not limited to the technical means disclosed in the foregoing implementations, and further include technical solutions constituted by any combination of the above technical features. It should be pointed out that many improvements and modifications may also be made for those of ordinary skill in the art without departing from the principle of the present invention, and these improvements and modifications shall fall into the protection scope of the present invention.

What is claimed is:

1. A method for detecting slow HTTP denial of service (DoS) in a backbone network, comprising the following steps:
    step (1): obtaining a public backbone network dataset and attack dataset, and extracting traffic information therefrom; systematically sampling traffic according to specific scenario requirements and a rate of 1/n to obtain sampled traffic, wherein n is a constant;
    step (2): analyzing a principle of slow HTTP DoS (SHD) attacks, extracting several unidirectional traffic features that reflect overall characteristics of the attacks, extending specific unidirectional traffic features from original features according to differences in different types of SHD attacks, so as to build a feature group for each type of SHD attack;
    step (3): extracting and storing the features described in step (2) on the basis of the sampled traffic according to different attack types by using a FarmHash function, Bitmaps, and a custom Count-min Sketch data structure, wherein the custom Sketch structure is configured to reduce storage overhead;
    step (4): labeling the features according to an actual type of traffic to form a labeled feature vector, the label comprising three types of attack traffic and normal traffic;
    step (5): selecting a machine learning algorithm with lower complexity in order to further improve a processing speed, and inputting the feature vector obtained in step (4) into the machine learning algorithm for training to obtain detection models for the three types of SHD attacks;
    step (6): capturing real-time traffic from real backbone network nodes, and performing traffic sampling and feature obtaining operations separately according to the processes in steps (1) and (3), wherein the features here are still obtained from unidirectional traffic; and
    step (7): inputting unlabeled feature vectors generated in real time into the three attack traffic models obtained in step (5), correspondingly labeling the feature vectors according to output of the models to identify traffic types, and carrying out subsequent defense work according to the generated results.

2. The method for detecting slow HTTP DoS in the backbone network according to claim 1, wherein step (1) specifically comprises the following sub steps:
    sub step (1.1): obtaining the authoritative backbone network dataset as background traffic, wherein data in a unified format for subsequent processing are required to be selected or organized according to actual needs from backbone network datasets published on the Internet at present in incompletely identical forms;
    sub step (1.2): building a distributed attack environment to simulate real-time attacks, implementing three types of SHD attacks by using an authoritative SHD tool to obtain attack traffic, and unifying the attack traffic in the format of the background traffic in (1.1); and
    sub step (1.3): merging the background traffic and the attack traffic to obtain mixed traffic, and systematically sampling the mixed traffic according to the specific scenario requirements and the rate of 1/n to obtain the sampled traffic.

3. The method for detecting slow HTTP DoS in the backbone network according to claim 1, wherein step (2) specifically comprises the following sub steps:
- sub step (2.1): analyzing an overall principle of the SHD attacks, observing similar behaviors of different attack traffic, and extracting several unidirectional traffic features that reflect common characteristics, wherein these features do not involve specific content of an application layer, such as a quantity of TCP packets without payload, a quantity of TCP packets with payload, and distribution of <IP, port> pairs;
- sub step (2.2): further refining specific unidirectional traffic features for each attack based on the differences of different types of SHD attacks in traffic; and
- sub step (2.3): combining the common characteristics of SHD with corresponding specific features according to the attack types to build a specific feature group for each attack.

4. The method for detecting slow HTTP DoS in the backbone network according to claim 1, wherein step (3) specifically comprises the following sub steps:
- sub step (3.1): updating the Sketch data structure once every time a packet is obtained, wherein the custom Count-min Sketch structure has a plurality of storage units, and each of the storage units comprises several Bitmaps and counters to store various types of features;
- sub step (3.2): hashing the <IP, port> for a situation that the distribution of traffic in step (2.1) is not directly obtained, wherein a FarmHash function is used here in order to improve processing speed and reduce memory consumption; then mapping hash values to a Bitmap of the Sketch according to specific processing rules, and finally representing the distribution of traffic by a quantity of 1 in the Bitmap;
- sub step (3.3): directly obtaining other features in step (2) through specific formulas or storing other features by using the counters within the Sketch; and
- sub step (3.4): extracting data once after the units corresponding to each key are updated k times as required in the Count-min Sketch structure, and therefore, obtaining a feature vector after the units corresponding to the same <protocol, IP> are updated k times.

5. The method for detecting slow HTTP DoS in the backbone network according to claim 1, wherein in step (4), the features are extracted based on <protocol, IP> of packets, each type of attack traffic is generated by a specific IP during simulation of attacks, and therefore, the features are labeled with attack types based on <protocol, IP>; and if the IP of the feature does not belong to the specific attack IP, the traffic is background traffic and marked as normal traffic.

6. The method for detecting slow HTTP DoS in the backbone network according to claim 1, wherein in step (5), the features are trained by the machine learning algorithm, wherein the selection of the algorithm needs to consider the characteristics of processing speed, good classification performance, and over-fitting prevention, and a random forest algorithm is selected in this step to train the models for the three types of SHD attacks by the features in step (4).

7. The method for detecting slow HTTP DoS in the backbone network according to claim 1, wherein in step (6), the presence of SHD attack traffic in the backbone network is detected by deploying relevant software and hardware at some important nodes of the backbone network to capture real-time traffic; the traffic are unidirectional, and are in the same format as that in step (1.1); and systematic sampling is performed at the rate of 1/n, and features of the sampled traffic are extracted and stored according to step (3).

8. The method for detecting slow HTTP DoS in the backbone network according to claim 1, wherein step (7) specifically comprises the following sub steps:
- sub step (7.1): inputting the features generated in real time into the traffic models for the three types of SHD attacks obtained in the training phase for prediction, integrating prediction results of all the models, and labeling the current features to complete the detection of SHD traffic; and
- sub step (7.2): executing corresponding strategies according to the actual prediction results: releasing the normal traffic, and alarming the attack traffic to notify a network administrator; and determining whether to output the corresponding attack IP according to actual needs in the case that the features are extracted based on <protocol, IP>, so as to provide a basis for further defense operations.

* * * * *